United States Patent Office
2,871,706
Patented Feb. 3, 1959

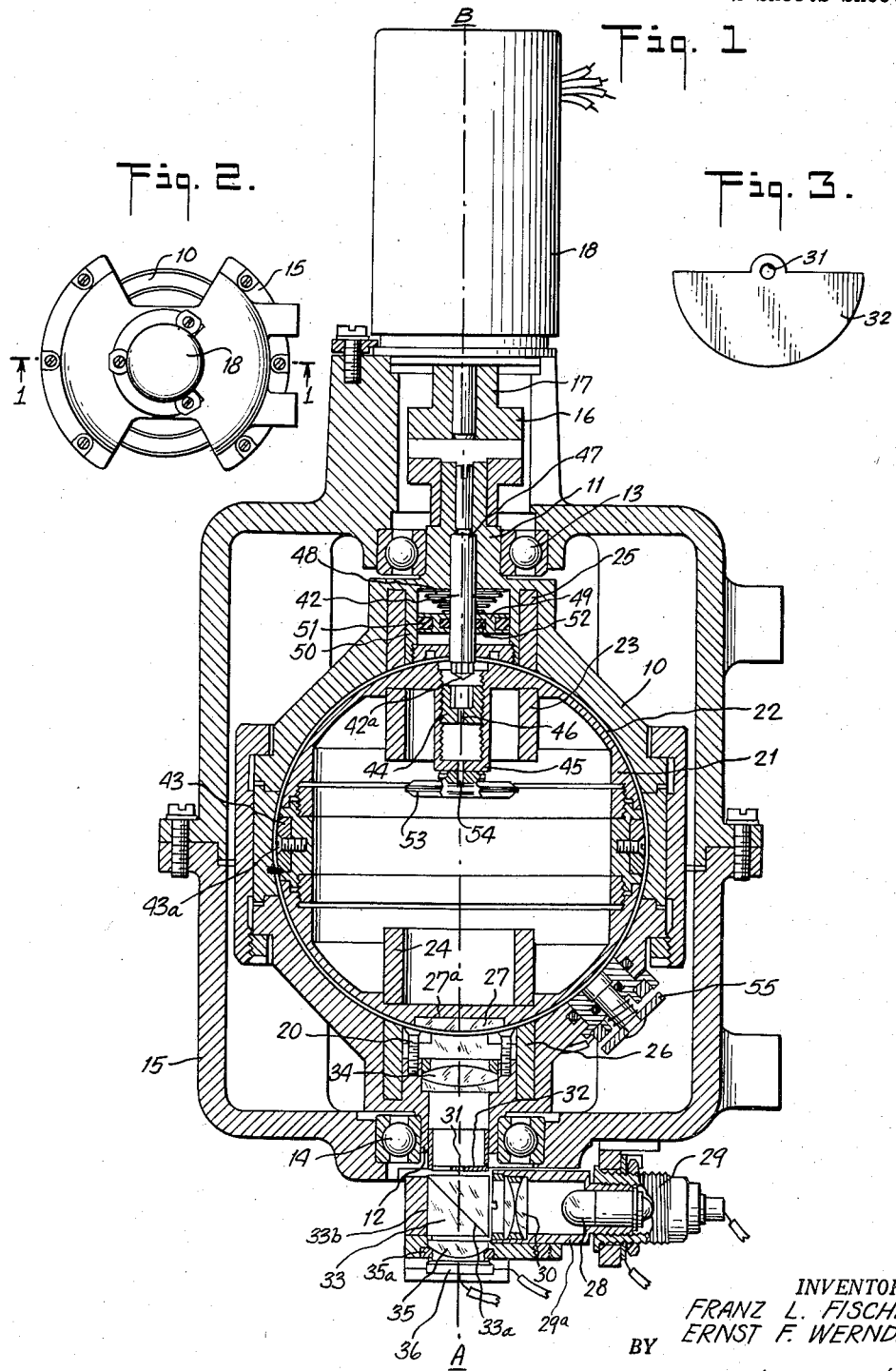

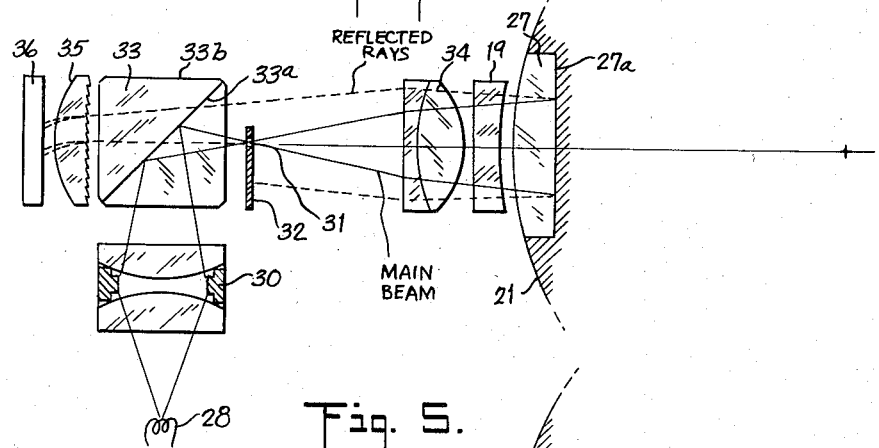
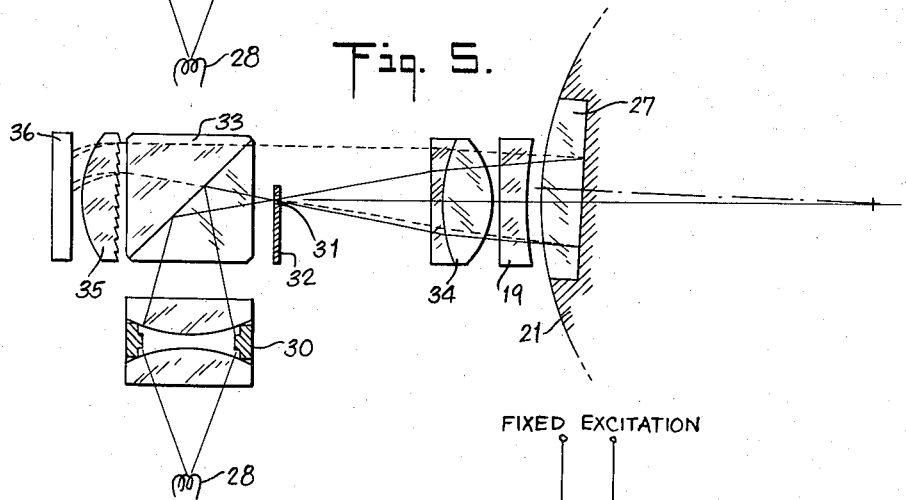
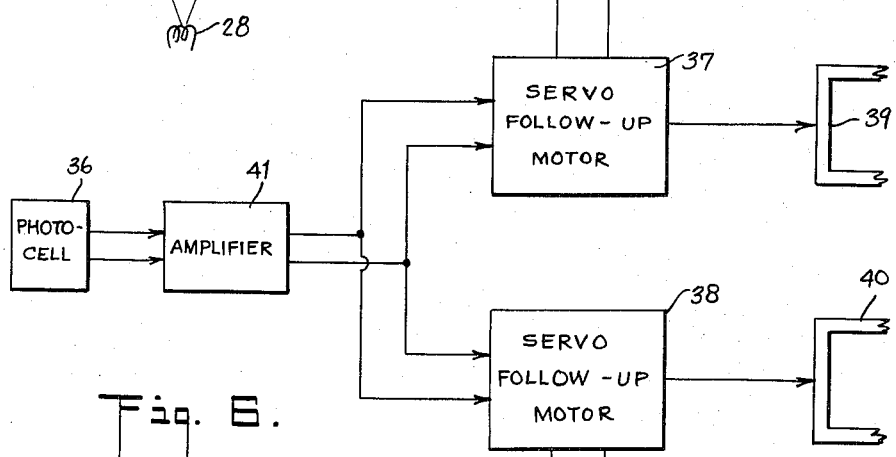

2,871,706

FRICTIONLESS FREE GYROSCOPE

Franz L. Fischer, Jackson Heights, and Ernst F. Werndl, New York, N. Y., assignors to Bulova Research and Development Laboratories, Inc., Woodside, N. Y., a corporation of New York Application June 22, 1956, Serial No. 593,087

10 Claims. (Cl. 74—5.7)

This invention relates generally to gyroscopic apparatus and more particularly to free gyroscopes of the type wherein the spinning axis of the gyro serves as a datum line for indicating the absolute angular displacement of the supporting base. The invention constitutes an improvement over the apparatus disclosed in the copending patent application Serial No. 569,365, filed March 5, 1956.

In gyroscopes of standard design the surrounding frame which rotatably supports the rotor is in turn given freedom to oscillate about an axis perpendicular to the spin axis. This is accomplished by additional mechanical bearings or by floating the frame in a fluid. In the latter instance, the frame is constructed as a floating sphere rotatable in a fluid which is at rest.

Existing gyroscopes generally take the form of an electric rotor and the energy necessary to initiate and maintain the spin of the rotor is fed thereto through slip rings or flexible wires. Such electrical coupling means interfere with the freedom of the gyro and exert disturbing forces thereon, as a result of which the gyro is caused to precess, though slowly, in an unpredictable manner. Another factor militating against gyro freedom and giving rise to undesirable precession is the friction in the rotor bearings. By reason of these disturbances, the gyro in time drifts away from its initial orientation and becomes useless for its intended purpose.

In the above-noted copending patent application there is disclosed a gyroscope wherein the rotor is floated in a liquid which during normal operation spins with the rotor. As previously indicated, in liquid float arrangements of the type heretofore known, a gyrosphere is rotatable in a fluid which is at rest. In contradistinction thereto, no relative motion exists between the liquid and the floating rotor in the gyroscope disclosed in said copending application. A significant advantage of this fluid coupling arrangement is that the angular momentum of the gyro is conserved indefinitely without loss to surrounding parts, and no energy has to be supplied to the gyro itself to maintain its spin.

In the frictionless gyroscope disclosed in said copending application, the rotor is constituted by a hollow mass, preferably spherical in form, which is floated in a hermetically-sealed vessel filled with a liquid whose density exceeds the mean density of the rotor, thereby rendering the rotor buoyant. The vessel is supported within a gimbal system such that the vessel maintains its position in spite of roll, pitch or azimuthal movement of the support. The vessel is set into motion by a motor whereby the fluid and the gyro rotor floated therein is also caused to rotate synchronously with the vessel and without relative motion therebetween. Means mechanically independent of the rotor are provided to detect the angular displacement of the rotor axis relative to the vessel and to produce a signal whose phase and magnitude is a function of said displacement. The signal controls a servo-mechanism automatically operating on said gimbal system so as to re-align said vessel axially with said rotor.

The principal object of the present invention is to provide improved optical detection means in a gyroscope of the type disclosed in said copending application, which detection means are adapted to produce an output signal having an alternating current component whose phase and magnitude depends on the angular displacement of the rotor axis relative to the vessel containing the rotatable float. This alternating current signal may be applied to a servo system to realign said vessel.

Also an object of the invention is to provide improved mechanical means for adjusting the mass distribution in the float of said gyroscope.

Still another object of the invention is to provide pressure-responsive means automatically to adjust the balance of said gyroscope in the course of operation, thereby preventing drift.

It is a further object of the invention to provide clamping means to lock the rotatable float of the gyroscope to the surrounding vessel to facilitate adjustment.

For a better understanding of the invention as well as further features and other objects thereof, reference is had to the following detailed description to be read in conjunction with the accompanying drawing wherein like components in the several views are identified by the reference numerals.

In the drawings:

Fig. 1 is a cross-sectional view taken through the longitudinal axis of a gyroscope in accordance with the invention, the section being taken along the plane indicated by line 1—1 in Fig. 2.

Fig. 2 is an end view of the gyroscope shown in Fig. 1.

Fig. 3 separately shows the diaphragm included in the apparatus of Fig. 1.

Fig. 4 is an enlarged view of the optical detection system incorporated in the gyroscope in the condition where the rotary float and vessel are in axial alignment.

Fig. 5 shows the optical system as it operates when the float and vessel are out of alignment.

Fig. 6 is a schematic diagram of the motor follow-up system for the gyroscope to restore alignment.

Referring now to the drawings and more particularly to Figs. 1 and 2, the gyroscope in accordance with the invention is constituted by a hollow vessel 10 provided at diametrically opposed positions with trunnions 11 and 12. These trunnions are of tubular construction and are journalled within ball bearings 13 and 14, respectively, supported at axially aligned positions on a rigid frame 15. The axis of rotation for vessel 10 is represented in Fig. 1 by line A—B. The upper trunnion 11 is connected by a coupling member 16 to the armature shaft 17 of an electric motor 18 which when energized acts to turn the vessel 10 at high speed about the vertical axis represented by line A—B. Closing the inner end of lower trunnion 12 is a transparent window 19 which is affixed by means of screws 20.

Disposed freely within vessel 10 is a hermetically sealed rotable float 21, the space therebetween being filled with a liquid 22 whose density is slightly higher than the mean density of the float so as to impart buoyancy thereto. The inner wall of vessel 10 is a surface of rotation, preferably spherical, and the outer surface may have a corresponding form. It is to be understood that the invention is not limited to a spherical form for the vessel, and any other symmetrical construction giving freedom of movement to the float may be employed.

Float 21 is preferably constructed of a hollow sphere whose outer diameter is somewhat smaller than the inner diameter of vessel 10 to define a spacing therebetween. In practice this spacing may be quite narrow. The liquid 22 may be composed of distilled water and glycerine with the addition of a small quantity of salicylic acid in such proportion as to provide a specific gravity sufficient to float the rotor. Obviously, many other liquid compositions such as silicone oil are suitable. High density liquids may also be used.

The gyro float 21 is made hollow so that its mean density may be slightly less than that of the surrounding liquid 22. Float 21 has a small positive buoyancy so that when in rotation about axis A—B, the resultant of the centrifugal force will center the rotor radially on that axis, but the float will be free to move in the axial direction. For centering the float within axis A—B and to prevent it from physically contacting the inner surface of the vessel, two permanent magnets 23 and 24 of annular shape are disposed at opposing poles of float 21 adjacent two similar permanent magnets in axial registration therewith on the vessel 10. Magnets 23 and 25 and magnets 24 and 26 are arranged with their like magnet poles facing each other, whereby the magnets are in repelling relationship, thereby producing a centering action along axial line A—B tending to maintain the float out of contact with the inner wall of the vessel.

In order that float 21 may spin stably about axis A—B, its moment of inertia around A—B must be greater than about any other axis. As shown in Fig 1, this is achieved by making the wall thickness of the float greatest at the equator and tapering off toward the poles to afford an equatorial concentration of mass. It will be obvious that many other configurations may be used to fulfill the same condition.

Now the floating sphere, having its highest momentum in the plane of the equatorial ring, will act as a freely suspended gyro without friction. It will maintain its position in space regardless of any tilting of the outside driving vessel. It is to be understood that the centering action may also be obtained by electromagnetic means on the casing in lieu of permanent magnets.

In order to detect the angular position of float 21 with respect to vessel 10 both as to roll and pitch, a small transparent mirror 27 of plastic material is attached to the lower pole of float 21, the inner surface 27a of the mirror being silvered to render it reflective. The mirror is visible through hollow trunnion 12 and a window 19 which may be made of the same material as the mirror.

An electric lamp 28 is supported in a suitable socket 29 secured to the exterior of frame 15 at a position normal to axis A—B, the socket being mounted at the end of a cylindrical housing 29a. Light rays from the lamp are caused to converge by an optical condenser 30. Condenser 30 brings the beam to focus in the small central aperture 31 of a diaphragm 32 after reflection at the surface of a beam-splitting cube type prism 33 having a surface 33a which is inclined 45° relative to the beam and has half-reflecting properties, the end surface 33b being coated a dull black and being non-reflecting. Diaphragm 32, as shown separately in Fig. 3, is constituted by a semi-circular plate having the aperture 31 formed in an arcuate tag at its axial position. The diaphragm 32 is mounted on a cylindrical support within trunnion 12 at the outer end thereof and rotates therewith.

As shown in Fig. 4, after passing centrally through the aperture 31 in the diaphragm, the main beam from lamp 28 diverges again to impinge on a convex lens 34 supported within trunnion 12 adjacent window 19. The beam rays are rendered substantially parallel by lens 34, they pass through window 19 and are reflected by the inner silvered surface 27a of a mirror 27. The window 19 and mirror 27 preferably have the same index of refraction as the flotation liquid and may be made for example of Lucite.

After reflection by mirror 27, the rays pass in the reverse direction through window 19 and lens 34 and the light proceeds as a wide pencil until it is partially obstructed by a semicircular diaphragm 32.

If the rotatable float 21 and its surrounding vessel 10 are in coaxial correspondence, the center line of the beam will pass through the center of rotation of diaphragm 32 and exactly one-half of the light will be cut off. This is the condition illustrated in Fig. 4. The remainder will pass through the half reflecting prism 33. These rays then pass through a lens 35 to a photoelectric device 36 such as a selenium cell which receives a constant amount of light as the diaphragm revolves, and so generates a steady direct current. Lens 35 is spaced from cell 36 by means of ring 35a whose internal wall is highly polished.

Thus where the float 21 and the vessel 10 are truly aligned, as illustrated in Fig. 4, the rotation of the vessel and the accompanying rotation of the diaphragm 31 does not affect the amount of reflected light caused to strike the photocell; hence the photocell output in this condition is unvaried.

When, however, the gyro float is displaced from the axis of the vessel, in the manner illustrated in Fig. 5, the whole of the reflected beam passes the diaphragm 31 and twice as much light reaches photocell 36 at the particular moment than there is at any time according to the axial coincidence condition illustrated in Fig. 4. But when the diaphragm in the course of rotation has made another half turn, it will occult or block the reflected beam completely. Hence the photocell will generate a current with an alternating-current component whose frequency corresponds to the rate of vessel rotation, the amplitude depending on the extent of displacement of the float relative to the vessel, the phase depending on the direction of axial displacement. By reason of this phase difference it is possible to discriminate roll from pitch or yaw from pitch or roll from yaw, depending on the initial orientation of the spin axis. After amplification, this alternating-current component can feed the variable phase of a two-phase motor of which the other phase is separately excited. The motor may be used to align the vessel with the gyro float, but it will only run if the variable phase supplied by the photocell is in phase quadrature or has a component in quadrature with the fixed phase.

Thus, as shown in Fig. 6, we may have two servo follow-up motors 37 and 38, say one for roll and one for pitch adapted to adjust the angular positions of pivotally supported gimbals 39 and 40, respectively. Each of the motors is a two-phase device supplied by separate sources of fixed excitation differing in phase by 90°. The output signal of photocell 36 is fed through a common amplifier 41 to the input of both motors. Therefore the inputs for motor 38 will be in phase quadrature to correct for roll and that to motor 37 will be in phase quadrature to correct for pitch. When the vessel alignment is restored, the photocell output will be a direct current and the servo motors will remain at a standstill until such time as a displacement occurs.

Alternatively in place of a gimbal system, which in essence resolves a displacement in terms of rectangular coordinates, we may make use of a system based on polar coordinates. For instance, the vessel may be driven by a friction roller to an extent depending on amplitude, the roller being oriented by an amount depending on the phase of the signal.

Before the apparatus is put to work, the float may be in any position within 2° or so of angular displacement allowed by a limiting stop 42. When stationary, the float 21 will generally be touching one side of vessel 10. When vessel 10 is set into rotation by motor 18, it will initiate rotation of the liquid 22 in the same direction. This in turn will engender rotation of float 21 about axis A—B. As the rotation continues, even if the servo motors are not energized, float 21 will erect itself for two reasons.

First, the dynamic forces will urge the float 21 to spin around the rotational axis marked by magnets 23 and 24. Second, if this axis does not coincide with the axis of spin of the liquid, there will be a component of the viscosity torque at right angles to the rotational axis, causing precession in a direction towards coincidence.

Therefore during the spin-up period the float 21 will be aligned slowly to vessel 10. The spin of the float will be accelerated according to the difference in the spins of the float and vessel. Ultimately float 21 and vessel 10 rotate synchronously with each other and with the separating liquid 22, the inner element being centered equatorially and axially in the outer element by the centrifugal action of the liquid and by repulsion of the magnets.

The float now spins completely free of disturbing couples so long as the vessel is in alignment therewith. This condition is assured by the servo-motor system, for if alignment is not perfect, the light beam reflected from mirror 27 will cause an A.-C. component to be generated by photocell 36 and the servo motors will shift the vessel 10 in the gimbal system to restore alignment.

Owing to the relatively small number of parts making up the sensitive gyro element, very few adjusting or balancing operations are required. In practice there are only two critical adjustments and these will now be described.

First, it is essential that the mirror 27 in the follow-up system be perpendicularly disposed to the principal axis of the spinning float, as defined by the distribution of mass round the equator. If this is not done, the beam reflected from the mirror when the float is spinning stably will not revert to its old path but will sweep out a cone of light. This can be corrected by tilting the mirror with reference to the float. However, it is more expedient to vary the mass distribution in the float itself and thereby bring the principal dynamic axis at right angles to the mirror.

This is accomplished by means of three or more disc-shaped washers 43 which are disposed at equi-spaced points round the equator of the float. These washers are made of two semi-circles of metals of dissimilar density, say brass and aluminum, welded together on the diameter so that rotation of one washer about its fixing screw 43a redistributes the mass relative to the equator of the float. The washers are sunk into recesses on the spherical outer surface of the float so that this surface is virtually unbroken. The adjustment of the washers is effected before the float is assembled in the outer vessel and the washers are then locked into place by tightening the screws which hold them.

The second adjustment is concerned with balancing the rotatable float so that there will be no gravity couples acting on it to cause drift. This is ensured by a balancing adjustment which brings the center of gravity of the float into coincidence with the center of buoyancy in such a way that when the axis of spin is horizontal, these two centers are in the same vertical plane. For exact adjustment of this balance it is desirable to run the complete gyro, measure the rate of drift over a considerable period of time and then readjust the balance until the drift is zero.

This adjustment is effected by means of a screw plug 44 which is carried in an internally threaded tube 45 supported coaxially within magnet 23. By screwing plug 44 more or less into tube 45, the center of gravity of the whole float can be shifted along the polar axis. The head of the plug is washed by the flotation liquid to allow for displacement of the liquid as the plug is adjusted, a small hole 46 being drilled longitudinally through the plug.

Rotation of the screw plug 44 is effected by means of the built-in wrench 42 carried in the skin of the outer casing through trunnion 11, the inner end 42a of the wrench being of hexagonal shape to engage a corresponding recess in the screw plug. The built-in wrench is normally out of contact with the plug because of the hydrostatic pressure of the fluid in the outer casing 10, which forces the wrench against the shoulder 47. This pressure on the fluid is maintained by a helical spring 48 pressing against a piston 49 which is movable within a cylinder 50 about which annular magnet 25 is supported. To prevent leakage, the outer rim of the cylinder 50 is provided with an O ring 51. The wrench 42 passes through the center of piston 49 and is sealed against leakage by another O ring 52.

The wrench is thus normally cut out of contact with screw plug 44 and it then constitutes a limiting stop which prevents the float from getting more than one or two degrees out of line with the outer vessel 10 when the gyro is out of action. This means that when the gyro is restarted it has to be erected only through a small angle to bring it into the normally working position.

The piston 49 and spring 48 serve as an expansion unit to take up expansion and contraction by heat of the fluid. In this way a very accurate balance can be made in a comparatively short time. The screw plug 44 is calibrated so as to give a definite change of drift rate for one rotation and therefore when the actual rate of drift has been found by experiment, the amount of displacement to be given to the plug can easily be calculated and the operation can be performed without dismantling the unit.

For a fine adjustment which can be carried out while the gyro is running in normal fashion, there is provided a pressure-sensitive bellows 53, such as an aneroid capsule. This is secured to the end of the tube 45 within the spherical float, its outer surface being exposed to the atmosphere within the sphere. The interior of the capsule is in communication with the interior of tube 45 through passage 54 and thus with the general body of the flotation liquid. By increasing or decreasing the quantity of liquid in vessel 10, the pressure of the liquid can be varied with a consequent extension or contraction of the axial length of the capsule. In this way the weight of the capsule and the oil it contains can be shifted along the axis of the float to cause the required change of balance.

Clamping means 55 are provided to hold the float relative to the vessel while the screw plug 44 is being adjusted. These clamping means may also serve to enable the inner float to be brought up quickly to synchronous speed without depending on the viscosity of the floating liquid for this purpose. When the clamp is in operation, the outer vessel and the inner float act as one piece and entrain the fluid in the space therebetween. When the desired speed has been attained, the clamp is released and thereafter the inner float is free of any mechanical linkage with the outer vessel.

The gyrosphere disclosed herein may be supported in a gimbal system (39 and 40 in Fig. 6) for rotation within mutually perpendicular planes in a manner similar to that illustrated in the above-noted copending application.

While there has been shown what is considered to be a preferred embodiment of the invention, it will be manifest that many changes and modifications may be made therein without departing from the essential spirit of the invention. It is intended, therefore, in the annexed claims to cover all such changes and modifications as fall within the true scope of the invention.

What is claimed is:

1. A gyroscope comprising a rotatable float, a vessel surrounding said float and spaced therefrom, a liquid filling said space and having a density rendering said float buoyant therein, a pair of trunnions secured at polar positions on said vessel to effect rotation thereof, at least one of said trunnions being of hollow construction, a mirror attached to said float at a polar position thereon visible through said hollow trunnion, means to direct a light beam axially through said hollow trunnion to impinge on said mirror, a diaphragm supported within said hollow trunnion and rotatable therewith, and photosensitive detector means responsive to reflected rays from said mirror as intercepted by said diaphragm to produce a signal having an alternating-current component whose phase and amplitude depends on the axial position of said float relative to said vessel.

2. A gyroscope comprising a rotatable float, a spherical vessel surrounding said float and spaced therefrom, a liquid filling said space and having a density rendering said float buoyant therein, a pair of trunnions secured at polar positions on said vessel to effect rotation thereof, at least one of said trunnions being of hollow construction, a mirror attached to said float at a polar position thereon visible through said hollow trunnion, means to direct a light beam axially through said hollow trunnion to impinge on said mirror, a semi-circular diaphragm supported within said hollow trunnion and rotatable therewith, and photosensitive detector means responsive to reflected rays from said mirror as intercepted by said diaphragm to produce a signal having an alternating current component whose phase and amplitude depends on the axial position of said rotor relative to said vessel as a function of roll and pitch.

3. A gyroscope comprising a rotatable float, a spherical vessel surrounding said rotor and spaced therefrom, a liquid filling said space and having a density rendering said float buoyant therein, a pair of trunnions secured to polar positions on said vessel to effect rotation thereof, at least one of said trunnions being of hollow construction, a mirror attached to said float at a polar position thereon visible through said hollow trunnion, a half-reflecting prism disposed to direct a light beam from a source normal to the axis of said trunnion through said hollow trunnion to impinge on said mirror, a diaphragm supported within said hollow trunnion and rotatable therewith, and photosensitive detector means responsive to reflected rays from said mirror as intercepted by said diaphragm and passing through said prism to produce a signal having an alternating-current component whose phase and amplitude depends on the axial position of said float relative to said vessel.

4. A gyroscope comprising a floatable rotor, a spherical vessel surrounding said rotor and spaced therefrom, a liquid filling said space and having a density rendering said rotor buoyant therein, a pair of trunnions secured to polar positions on said vessel to effect rotation thereof, at least one of said trunnions being of hollow construction, a mirror attached to said rotor at a polar position thereon visible through said hollow trunnion, a light source disposed to cast rays in a direction normal to the axis of said hollow trunnion, a semicircular diaphragm disposed within said trunnion and having an aperture in axial alignment therewith, a half-reflecting prism having a 45° inclined surface position to reflect light from said source onto said mirror through said aperture, said mirror reflecting said light through said prism, said reflected light being interceptible by said diaphragm, and a photocell positioned to respond to said reflected light passing through said prism, the amount of light passing through said prism depending on the axial position of said rotor relative to said vessel, said rotating diaphragm in the case of axial misalignment acting periodically to occult said reflected rays to produce an alternating-current component in the output of said photocell.

5. In a free gyroscope, a hollow spherical float whose walls are of greatest thickness at the equator thereof to provide an equatorial mass concentration stabilizing said rotor, means to adjust the distribution of mass on said float to balance same, a spherical vessel surrounding said float and spaced therefrom, a liquid filling said space and having a density imparting positive buoyancy to said float, a first pair of permanent magnets secured at opposing poles of said float, a second pair of magnets secured at diametrically opposed positions on said vessel in repelling relationship with said first magnets, and drive means to rotate said vessel at high speed about a given axis whereby said float is caused to rotate synchronously therewith.

6. A gyroscope, as set forth in claim 5, wherein said means to adjust the mass distribution is constituted by a plurality of washers attached to said rotor at circumferentially spaced positions thereon, each washer being formed by two semi-circular pieces of dissimilar metals bonded together.

7. A gyroscope comprising a floatable rotor, a spherical vessel surrounding said rotor and spaced therefrom, a liquid filling said space and having a density rendering said rotor buoyant therein, means supporting said vessel for rotation within a frame, a pivotally mounted gimbal, means pivotally mounting said frame within said gimbal, said frame and gimbal oscillating about mutually perpendicular axes, first and second servo-motors for adjusting the respective angular positions of said frame and said gimbal, optical means to detect the angular position of said rotor axis relative to the vessel and to produce a signal having an alternating-current component whose phase and magnitude are a function of said displacement in mutually perpendicular directions, and means to apply said signal both to said first and second motors to restore said vessel to axial alignment with said rotor.

8. A gyroscope comprising a floatable rotor, a spherical vessel surrounding said rotor and spaced therefrom, a liquid filling said space and having a density rendering said rotor buoyant therein, means supporting said vessel for rotation within a frame, a pivotally mounted gimbal, means pivotally mounting said frame within said gimbal, said frame and gimbal oscillating about mutually perpendicular axes, first and second two-phase servo-motors for adjusting the respective angular positions of said frame and said gimbal, separate sources of fixed excitation for said motors, said sources being in phase quadrature, optical means to detect the angular position of said rotor axis relative to the vessel and including a photocell to produce a signal having an alternating-current component whose phase and magnitude is a function of said displacement in mutually perpendicular directions, and common amplifier means to apply said signal both to said first and second motors to restore said vessel to axial alignment with said rotor.

9. In a gyroscope, a hollow spherical float whose walls are of greatest thickness at the equator thereof to provide an equatorial mass concentration stabilizing said float, a vessel surrounding said float and spaced therefrom, a liquid filling said space and having a density imparting positive buoyancy to said rotor, and means to adjust the center of gravity of the float to effect coincidence with the center of buoyancy, said means to adjust the center of gravity including a plug shiftable internally along the polar axis of said float, and a wrench built into the skin of said surrounding vessel and engageable with said plug.

10. In a free gyroscope, a hollow spherical float whose walls are of greatest thickness at the equator thereof to provide an equatorial mass concentration stabilizing said float, a vessel surrounding said float and spaced therefrom, a liquid filling said space and having a density imparting positive buoyancy to said rotor, and means to adjust the center of gravity of the float to effect coincidence with the center of buoyancy, said means to adjust the center of gravity including a pressure-responsive capsule mounted within said float and communicating with said fluid space.

References Cited in the file of this patent

UNITED STATES PATENTS

| | | |
|---|---|---|
| 1,890,831 | Smyth | Dec. 13, 1932 |
| 1,986,807 | Gillmor | Jan. 8, 1935 |
| 1,996,895 | Bennett | Apr. 9, 1935 |
| 2,613,538 | Edelstein | Oct. 14, 1952 |
| 2,691,306 | Beams et al. | Oct. 12, 1954 |

FOREIGN PATENTS

| | | |
|---|---|---|
| 150,452 | Great Britain | Sept. 9, 1920 |
| 414,780 | Italy | Aug. 24, 1946 |